United States Patent [19]
Howell et al.

[11] Patent Number: 6,105,982
[45] Date of Patent: Aug. 22, 2000

[54] CHILDREN'S RIDE-ON VEHICLE WITH FOUR-WHEEL STEERING

[75] Inventors: William R. Howell; Kurt J. Huntsberger, both of Chaffee, N.Y.

[73] Assignee: Mattel, Inc., El Segundo, Calif.

[21] Appl. No.: 09/014,834

[22] Filed: Jan. 28, 1998

[51] Int. Cl.$^7$ ................................................. B62D 15/00
[52] U.S. Cl. ................................... 280/91.1; 280/93.504; 280/99
[58] Field of Search ................................ 180/65.6, 65.7, 180/65.8, 239, 252, 292, 412, 65.5, 264, 63, 58, 59, 60, 61, 237; 280/100, 101, 102, 89, 93.504, 124.117, 87.01, 91.1, 99

[56] References Cited

U.S. PATENT DOCUMENTS

| | | | |
|---|---|---|---|
| 1,858,858 | 5/1932 | Janas | 280/87.01 |
| 1,868,912 | 7/1932 | Plank . | |
| 1,895,737 | 1/1933 | Shaw | 280/87.01 |
| 2,001,647 | 5/1935 | Alt | 280/87.01 |
| 2,191,184 | 2/1940 | Voorheis | 280/87.01 |
| 2,480,235 | 8/1949 | Gainsley | 280/87.01 |
| 2,571,750 | 10/1951 | O'Halloran | 280/87.01 |
| 3,069,182 | 12/1962 | Hufford | 280/87.01 |
| 3,174,767 | 3/1965 | Sendoykas | 280/87.01 |
| 3,398,971 | 8/1968 | Seidel | 280/87.01 |
| 3,596,730 | 8/1971 | Cecce | 180/236 |
| 3,693,741 | 9/1972 | Scheuerle | 180/56 |
| 3,709,315 | 1/1973 | Fisher . | |
| 3,888,324 | 6/1975 | Kossow . | |
| 4,100,990 | 7/1978 | Stedman | 180/135 |
| 4,327,519 | 5/1982 | Cooper et al. | 46/262 |
| 4,395,186 | 7/1983 | Whyte | 414/528 |
| 4,453,712 | 6/1984 | Lee | 273/86 B |
| 4,589,510 | 5/1986 | Duerwald et al. . | |
| 4,796,720 | 1/1989 | Bauer | 180/234 |
| 4,805,720 | 2/1989 | Clenet | 180/248 |
| 4,842,090 | 6/1989 | Shimizu | 180/140 |
| 4,892,503 | 1/1990 | Kumazawa | 446/456 |
| 5,288,091 | 2/1994 | Deschamps | 280/91 |
| 5,482,125 | 1/1996 | Pagett | 180/6.32 |

FOREIGN PATENT DOCUMENTS

27061  1/1924  France .

*Primary Examiner*—Paul N. Dickson
*Assistant Examiner*—Bridget Avery
*Attorney, Agent, or Firm*—Kolisch, Hartwell, Dickinson, McCormack & Heuser

[57] ABSTRACT

A children's ride-on vehicle is provided with a chassis having a seat configured to accommodate a driver. The chassis includes a generally vertical, cylindrical channel extending therethrough. A handlebar is disposed in front of the seat and is operable by the driver to steer the vehicle. A steering column, connected to the handlebar, is pivotal in the channel about a first vertical axis. A motor and gear train housing is coupled to the steering column for rotation with the steering column about the first vertical axis and the housing supports a battery, an electric motor powered by the battery, and a gear train operatively coupled to the motor. A front axle is captured in the housing nominally transverse the vehicle and two front wheels are rotatably held on the front axle and coupled to the gear train for driving the vehicle. A keyway in the channel and a mating structure on the steering column limit the pivoting of the steering column to about 7° from the nominal position in each direction. A bracket is pivotally mounted adjacent the rear of the chassis for rotation about a second vertical axis. A rear axle is mounted to the bracket transverse the vehicle. Two wheels are mounted to the second axle for rotation about an axis transverse the vehicle. A steering linkage is coupled between the front axle and the bracket for coordinated pivoting of the front axle and the rear axle for steering the vehicle.

15 Claims, 6 Drawing Sheets

CHILDREN'S RIDE-ON VEHICLE WITH FOUR-WHEEL STEERING

CROSS-REFERENCE TO RELATED APPLICATIONS

This application is related to co-pending U.S. application Ser. No. 09/015613 entitled "Laterally Slidable Foot Rest for a Ride-on Vehicle for Children," invented by William R. Howell and filed Jan. 28, 1998, the disclosure of which is incorporated by reference in its entirety.

BACKGROUND AND SUMMARY OF THE INVENTION

The present invention relates generally to children's ride-on vehicles. More specifically, the invention concerns a children's ride-on vehicle having a front steering column that mounts a motor and gear-train housing and a front axle for pivoting with the steering column about a first vertical axis to steer the vehicle. The vehicle has a rear axle pivotal about a second vertical axis and tied to the motor housing by a rod which pulls or pushes the rear axle to pivot it about the second vertical axis, thereby reducing the turning radius of the vehicle.

Children's ride-on vehicles are designed both to minimize the dangers to the children that ride them and to be built at a minimum cost to make them available to as many children as possible. One danger in the vehicles, as with any toy with large moving parts, is that a child will get a finger trapped and pinched between the moving parts. To avoid this danger, the parts are designed not to move close enough together to pinch. For example, wheels which are movable to steer and which are near to vehicle fenders or bumpers are stopped from moving too close to the fenders. This, however, limits the turning radius of the vehicles which makes the vehicles more difficult for children to turn effectively. Another danger in a small turning radius is a relatively high lateral g-force applied to the vehicle and the child during turning, raising the likelihood of the vehicle's tipping or the child's falling, especially when the vehicle is operated along a slope.

To minimize the cost of the vehicles, they are designed with as few parts as possible, especially metal parts. Many of the vehicles are made with a rack-and-pinion or similar style steering in which the steered wheels are turned relative to a fixed axle. However, this type of steering has a complex, expensive structure with several metal parts. A less expensive steering structure mounts an axle to be pivoted about a vertical axis for steering. Such axle mounts, especially when designed to avoid pinch points, result in a large turning radius.

The present invention provides a new steering design which is inexpensive and simple in construction because all moving parts of the steering assembly are plastic. At the same time, the design avoids the dangers of pinch points by not allowing the steered wheels to come too close to fenders and bumpers and still provides a relatively small turning radius. In this vehicle, a motor and gear-train housing is pivotally mounted at the front of the vehicle and a handlebar is operable by a child to pivot the housing about a vertical axis. A front axle is fixedly held in the housing and mounts two wheels which are rotatable under the motor's power for driving. The pivoting about the vertical axis is limited to 7-degrees in each direction so that the wheels never come closer than ¾-inches to a fender or bumper. A rear axle is also mounted to be pivotal about a vertical axis and is tied to the housing by a bar which pushes and pulls the rear axle to pivot it about the vertical axis in the opposite direction of the front axle, thus providing a turning radius equivalent to a 14-degree turn of one axle alone without the consequent pinching danger and also with a lower lateral g-force than the single-axle-steering vehicle. The steering system is, nonetheless, inexpensive to make and easy to assemble. The gear train includes a throw-out gear to disengage the motor from the wheels for easy pushing of the vehicle.

A general object of this invention is to provide a child's ride-on vehicle which is inexpensive and easy to assemble, both initially at the factory and finally at the home. A further object of this invention is to provide a vehicle with front wheel drive to reduce the size of the wiring harness. Yet another object of this invention is to provide a steering assembly that includes a modular motor and gear train housing that can be easily detached from the vehicle and shipped for repair, should that become necessary.

Another object of this invention is to provide a steering mechanism that avoids any pinching danger, but also provides a turning radius small enough that a child can effectively operate the vehicle in a small area. Another object of the invention is to provide such a vehicle with a small turning radius but with greater stability during turning and less danger of the vehicle's tipping or the child's failing off. Yet another object of the invention is to allow the vehicle to be pushed easily by allowing the motor to be disengaged from the wheels when the motor is off. A further object of the invention is to provide the vehicle with a forward center of gravity to reduce the danger of tipping backwards when the vehicle is pushed.

Yet another object of this invention is to provide a vehicle with easily operable controls to allow children as young as 1-year old to drive it.

These and additional objects and advantages of the present invention will be more readily understood after a consideration of the drawings and the detailed description of the preferred and alternative embodiments.

DETAILED DESCRIPTION OF THE PREFERRED EMBODIMENT

Figure 1:
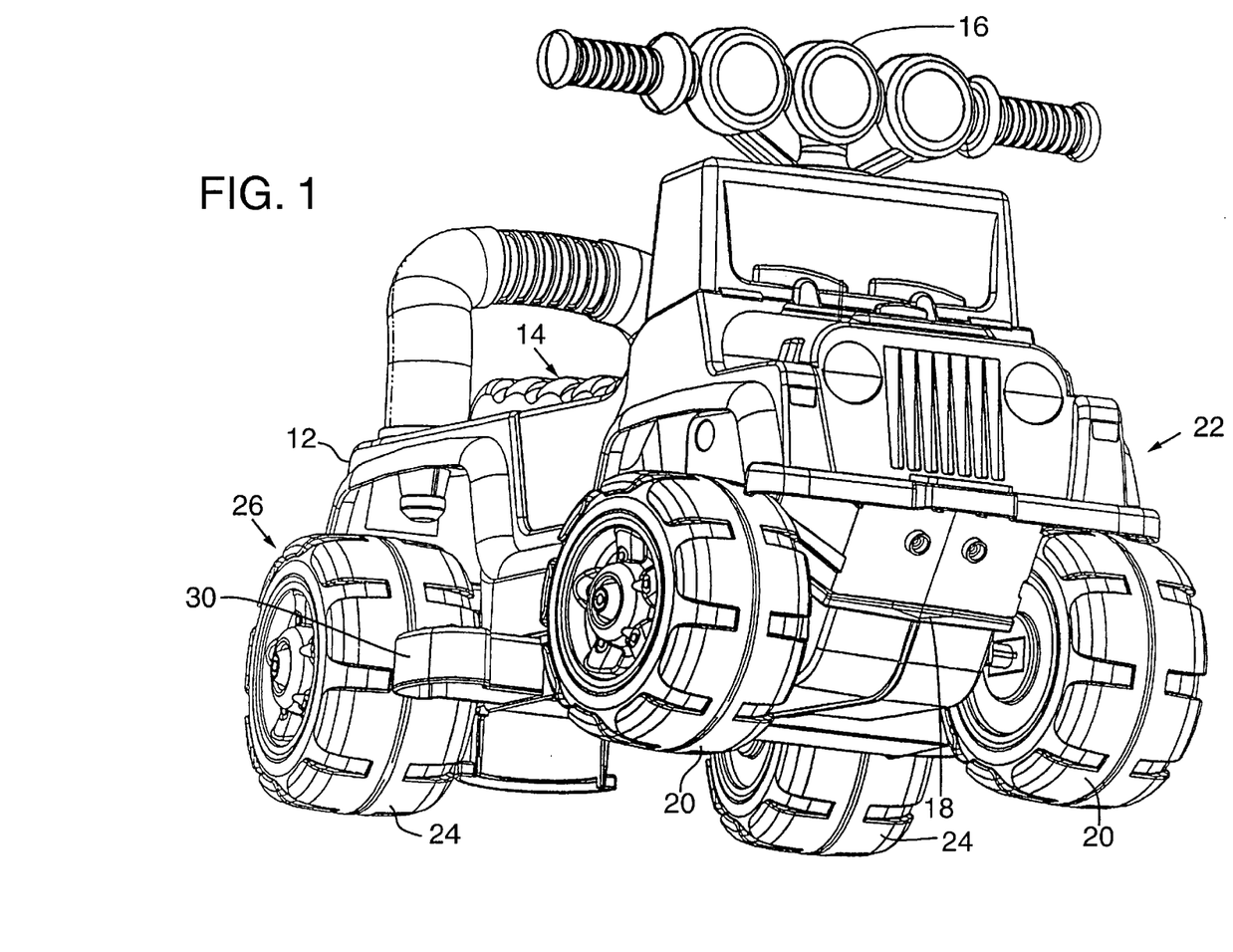
FIG. 1 is an isometric view of the vehicle according to the present invention, showing a body with a motor and gear train housing in the front between two front wheels, a handlebar, a seat, footrests, two rear wheels, a rear tip-over bar and a rear push bar.

As shown in FIG. 1, a vehicle, built according to the present invention and indicated generally at 10, includes a body or chassis 12 providing a seating area 14 to accommodate a driver. In front of seating area 14 is a steering control, such as handlebar 16 which is easily grasped by even a very young child for steering the vehicle. Handlebar 16 is operable to turn a motor and gear-train housing 18 and two front wheels 20 at a front end 22 of the vehicle and to turn a pair of rear wheels 24 at a rear end 26 of the vehicle, thereby to steer the vehicle. Vehicle 10 is relatively small, being only about 21.9-inches bumper-to-bumper and about 16.55-inches from the ground to the top of handlebar 16.

Figure 2:
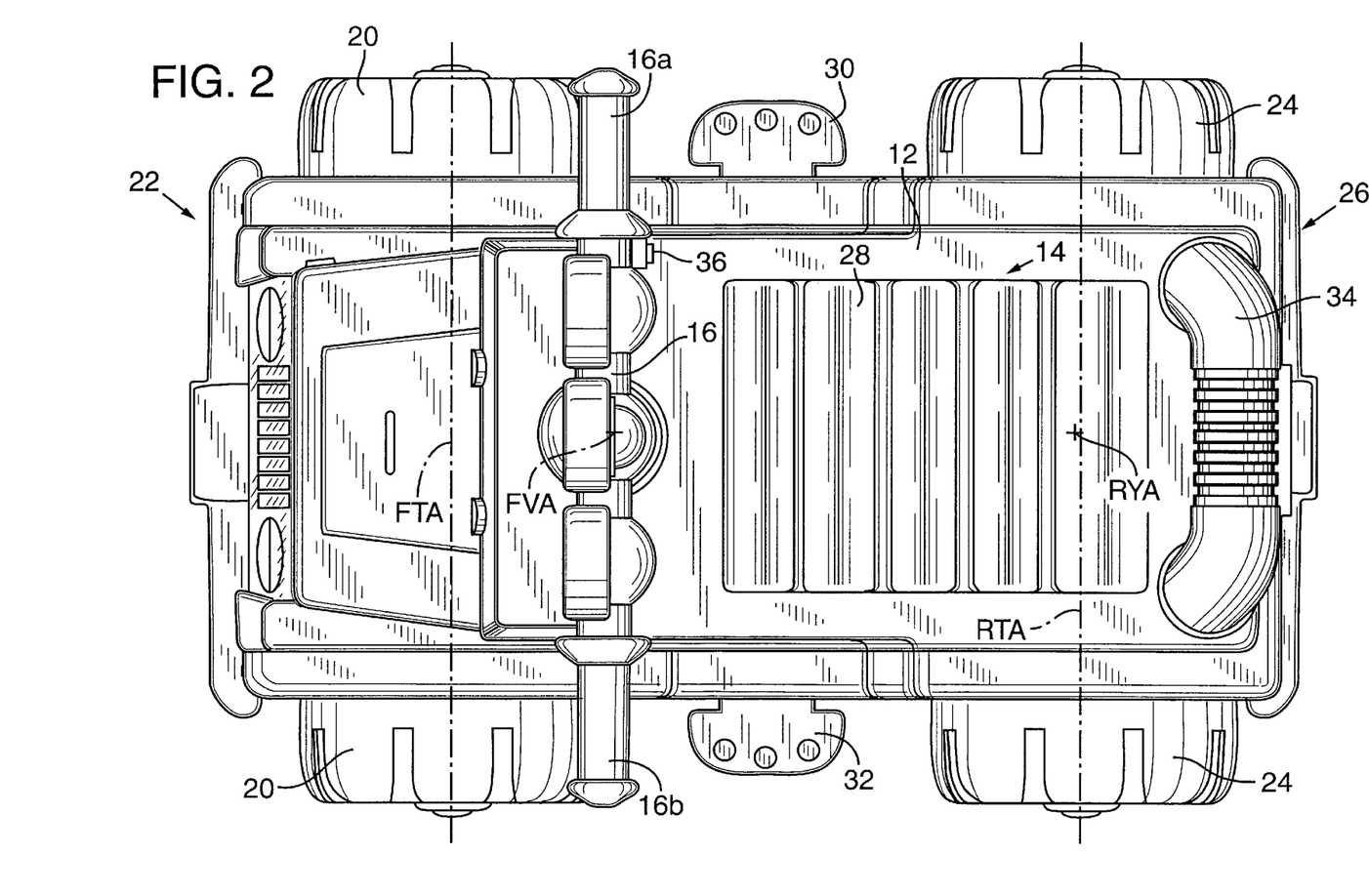
FIG. 2 is a top plan view of the vehicle of FIG. 1 showing front and rear axes transverse the vehicle and the axes, the handlebar and the front and rear wheels are in a nominal position for straight-ahead driving of the vehicle.

As shown in FIG. 2, seating area 14 includes a ribbed seat 28 and two foot rests 30, 32, one on each side of the chassis below the seat. FIG. 2 shows handlebar 16 in a nominal position for straight-ahead steering of the vehicle. Front wheels 20 are rotatably mounted for rotation about a front transverse axis FTA, and rear wheels 24 are rotatably mounted about a rear transverse axis RTA, to allow the vehicle to move forwards or backwards either by pushing or under its own power. Wheels 20, 24 and axes FTA, RTA are shown in a nominal position corresponding to the nominal position of the handlebar.

A rear push bar 34 is bolted to chassis 12 and is configured for pushing the vehicle even by a small child. Motor and gear-train housing 18, which includes a large portion of the weight of the vehicle, is located at the front of the vehicle opposite the push bar and thus provides a counterweight to discourage the vehicle from tipping down at the rear when the push bar is used.

A momentary power switch 36, which is spring-loaded to an off position, is mounted to handlebar 16 adjacent a right hand grip 16a. The child may depress and hold switch 36 with the thumb to drive the vehicle. Alternatively, switch 36 may be located adjacent a left hand grip 16b.

Figure 3:
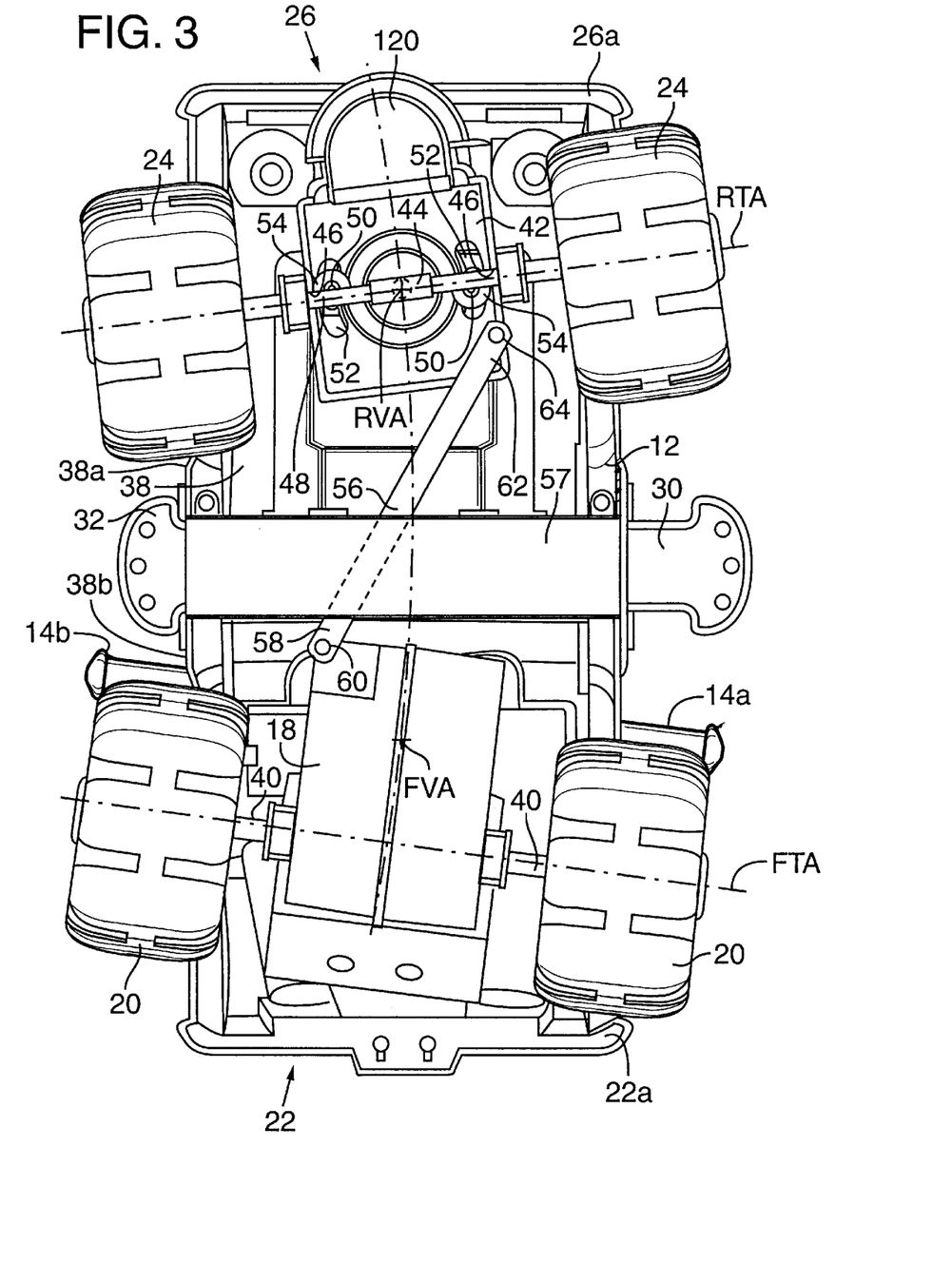
FIG. 3 is a bottom plan view of the vehicle of FIG. 1 showing a front axle held in the motor and gear train housing, a rear axle mounted to a pivotally mounted bracket which also mounts the rear tip-over bar, and a steering linkage cross-coupling the motor housing to the rear pivot bracket, shown with the axles offset to turn the vehicle.

FIG. 3 shows an undercarriage 38 of the vehicle with the handlebar 14 turned from the nominal position to a maximum turning position with front transverse axis FTA and rear transverse axis RTA offset from their nominal positions, each by about 7°. The axes offset in opposite directions, i.e., as shown, front transverse axis FTA has been offset clockwise and rear transverse axis RTA is offset counterclockwise. This opposite offsetting decreases the effective turning radius for the vehicle, making it equivalent to offsetting only the front wheel axis by about 14°.

Housing 18 is pivotal about a front, generally vertical axis FVA and mounts a front axle 40 which defines front transverse axis FTA. Front axle 40 mounts wheels 20 at opposite ends of the axle. A rear pivotal bracket 42 is mounted to the chassis adjacent rear 26 of the vehicle for rotation about a rear vertical axis RVA. Bracket 42 includes a half-cylindrical rib 44 and two slots 46 for holding a rear axle 48 which defines rear transverse axis RTA. Rear axle 40 mounts wheels 24 at opposite ends of the axle. As shown in FIG. 3, wheels 20, 24 preferably remain fixed relative to the axles for steering maneuvers. Rear wheels 24 can be seen to move close to a rear bumper 26a and a fender 38a and front wheels 20 move closer to a front bumper 22a and a fender 38b, but they remain at least about ¾-inches from contact to prevent pinching even at the maximum turning position.

Bracket 42 is coupled to chassis 12 by two screws 50 which screw into holes in the chassis and ride in two slots 52 in bracket 42. Screws 50 hold two washers 54 which bear against bracket 42 and allow it to pivot while maintaining it connected to chassis 12. Slots 52 are operative to limit the pivoting of bracket 42. As shown in FIG. 3, slots 52 allow greater than the 7° maximum turn, but they can easily be modified to any desired limit.

A steering linkage, such as rod 56, is coupled between housing 18 and bracket 42. A front end 58 of rod 56 is pivotally attached by a screw 60 to housing 18 eccentrically to front vertical axis FVA. Rod 56 extends above a transverse mount 57 for footrests 30, 32. A rear end 62 of rod 56 is pivotally attached to bracket 42 by a screw 64 eccentrically to rear vertical axis RVA. Because of the eccentric mounting, rod 56 is pushed and pulled at end 58 by housing 18 as housing 18 is turned about front vertical axis FVA by handlebar 14. Rod 56, in turn, pushes and pulls on bracket 42 and, due to the eccentric mounting, causes bracket 42 to pivot about rear vertical axis RVA. Each end of rod 56 is offset from the associated vertical axis by roughly the same amount, so any particular degree of pivoting of housing 18 causes roughly the same degree of pivoting at bracket 42. If the rear wheels or rear axle are manually moved pivoted to an offset position, rod 56 transmits that offset forward to cause the equivalent pivoting of the front wheels and axle.

Figure 4:
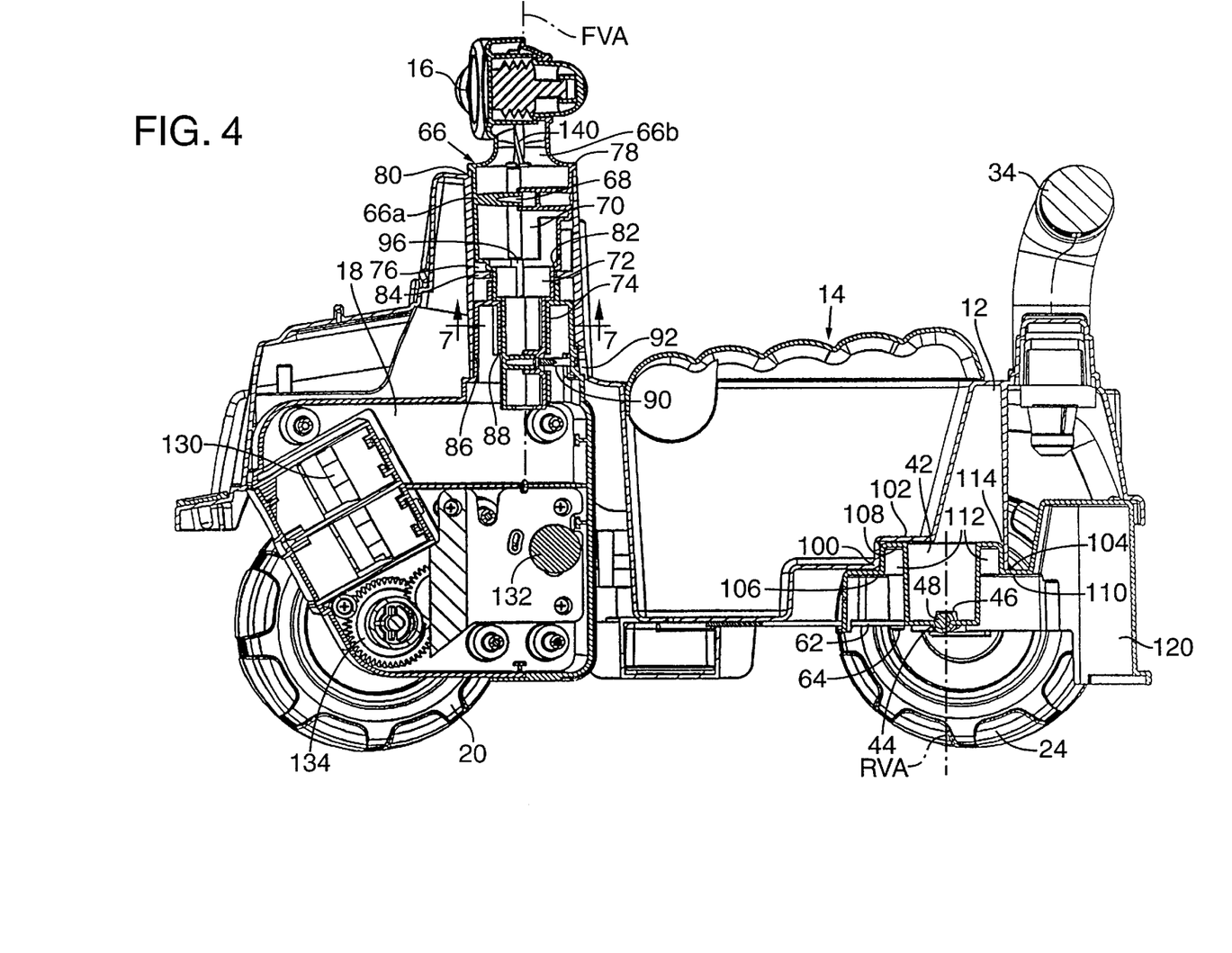
FIG. 4 is a side cross-section of the vehicle of FIG. 1 showing a vertical cylindrical channel in the chassis below the handlebar and the pivotal mounting within the channel of a steering column interconnecting the handlebar with the motor housing.
Figure 5:
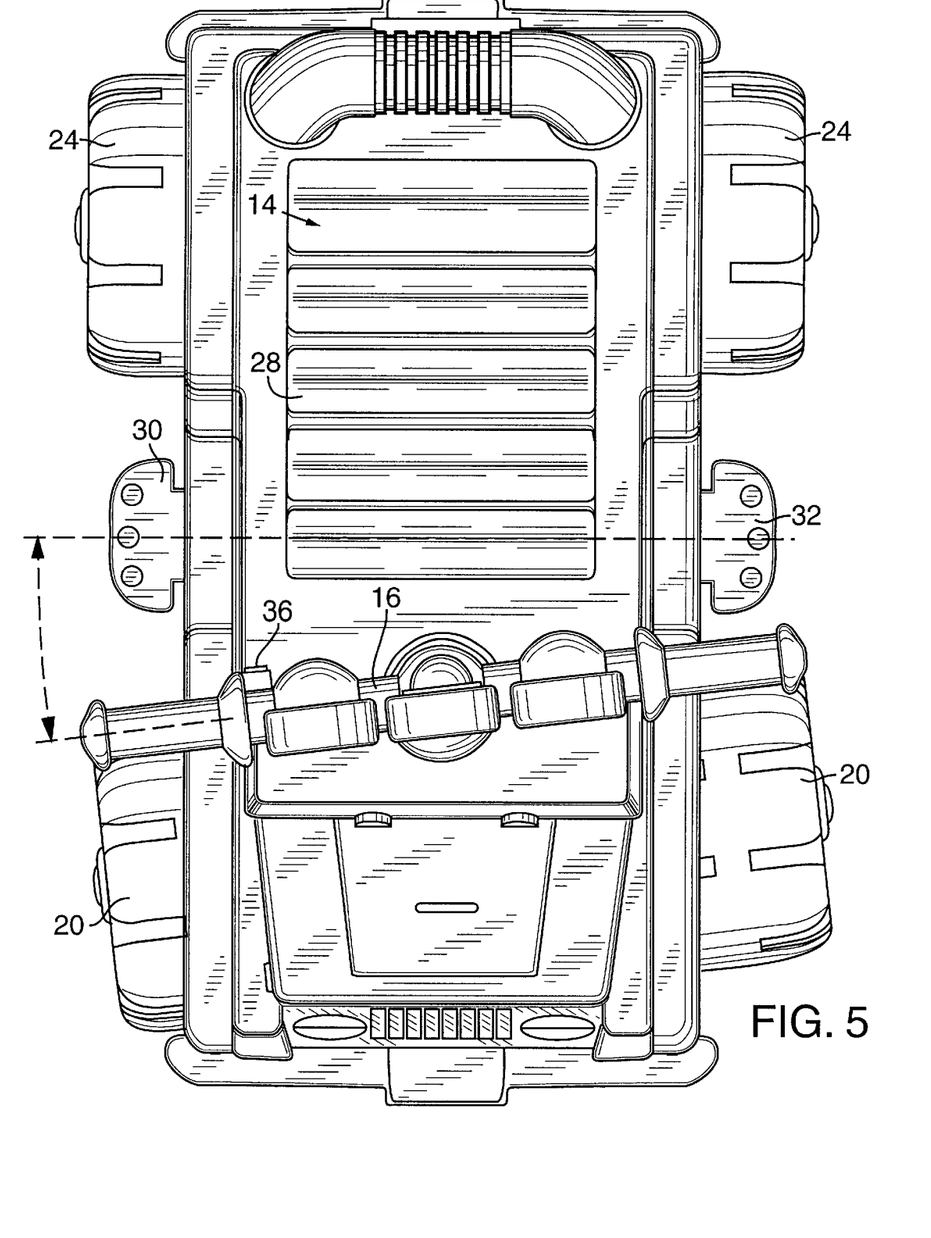
FIG. 5 is a top plan view of the vehicle of FIG. 1 showing the handlebar turned the maximum 7° to the left and the front and rear wheels offset correspondingly in opposite directions.

As shown in FIG. 4, forward vertical axis FVA extends through handlebars 14 which are coupled to a hollow, generally cylindrical steering column 66 formed of two mating halves 66a, 66b joined by several fasteners, such as a screw 68. Steering column 66 includes two cylindrical portions 70 and 72, the lower of which is smaller in diameter than the higher one, which allows column 66 to be inserted into chassis 12 only from above. Extending below cylindrical portion 72 is a square-cross-sectioned bar 74 which is generally narrower than cylindrical portion 72.

Chassis 12 includes a generally vertical, generally cylindrical channel 76 which has a decreasing diameter from top to bottom and receives, mates with, and pivotally mounts steering column 66 and provides bearing surfaces for cylindrical portions 70 and 72. In particular, cylindrical portion 70 includes an upper annular lip 78 which bears on a rim 80 of channel 76. In the transition from portion 70 to portion 72, column 66 includes an annular shoulder 82 which bears on an annular lip 84 of channel 76.

Figure 6:
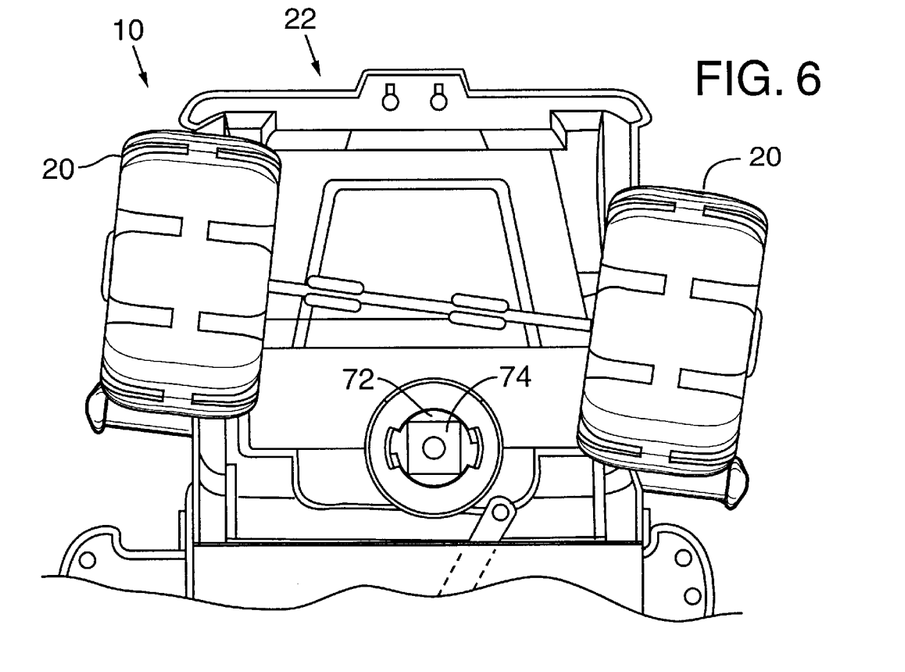
FIG. 6 is a bottom plan view of the vehicle with the motor housing removed showing a channel in the chassis and a steering column inserted in that channel and a keyway on the channel cooperating with mating structure on the column to limit the pivoting of the steering column.
Figure 7:
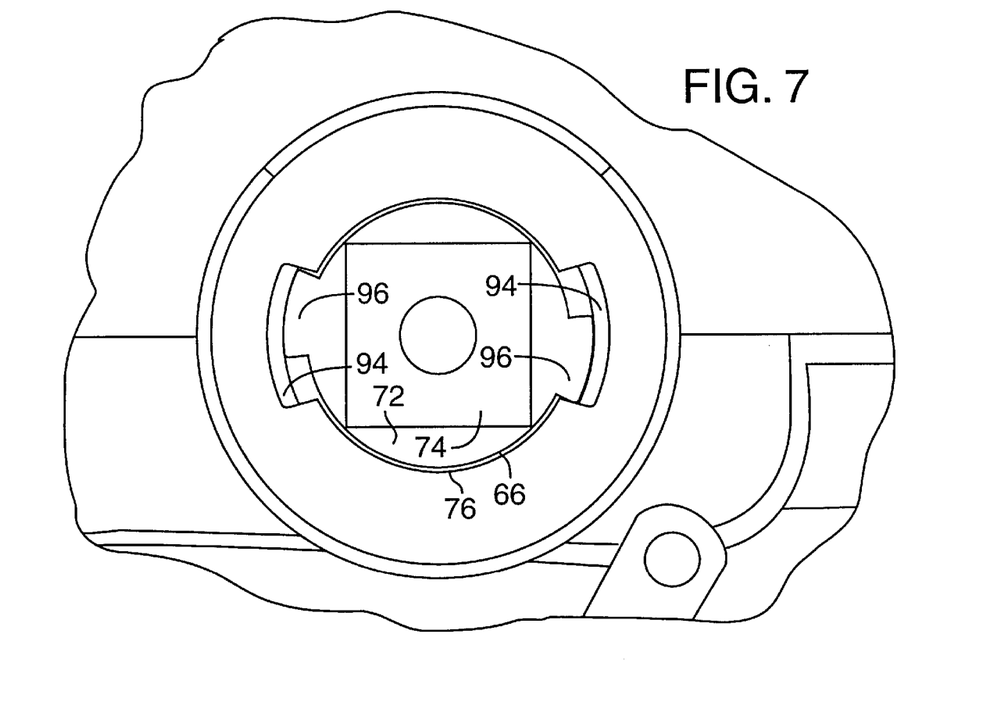
FIG. 7 is a cross-sectional view providing a close-up picture of the channel and keyway and the steering column and mating structure shown in FIG. 6.

Housing 18 includes an upwardly extending shaft 86 which is inserted from below into channel 76. Shaft 86 includes a central, vertical aperture 88 which receives bar 74 of column 66. Shaft 86 and bar 74 are releasably coupled together by a screw 90 which is accessible through an aperture 92 in chassis 12. Thus, steering column 66 and housing 18 are rigidly coupled together and pivotally mounted in channel 76 for rotation about front vertical axis FVA to steer the vehicle. As best seen in FIGS. 6 and 7, a keyway, such as slots 94, in channel 76 and mating structure, such as ribs 96, on column 66 are configured to limit the rotation of column 66 about front vertical axis FVA, preferably to about 7° in each direction from the nominal position.

Bracket 42, as seen in FIG. 4, is pivotally mounted to chassis 12 for rotation about rear vertical axis RVA. Chassis 12 includes three downward-facing bearing surfaces 100, 102 and 104 against which three complementary upward-facing surfaces 106, 108 and 110 on bracket 42 bear as bracket 42 pivots. Bracket 42 includes an upwardly extending annular guide 112 which fits into and rotates within a cylindrical guide 114 in chassis 12 to guide the pivoting of bracket 42 about rear vertical axis RVA. Bracket 42 also includes a tip-over bar 120 which prevents the vehicle from being tipped over when pushed down at push bar 34.

Housing 18 mounts an electrical power source, such as batteries 130, a motor 132, powered by batteries 130, and a gear train 134. Motor 132 is operatively connected through gear train 134 to front wheels 20 for driving the vehicle. Batteries 130 are preferably six standard, non-rechargeable D-size batteries. Power switch 36 (FIG. 2) selectively connects batteries 130 to motor 132 through a wiring harness 140 which runs from handlebar 14 through column 66 and aperture 88 in shaft 86 to batteries 130 and motor 132. Motor 132 is mounted on an arm, such as that shown in U.S. Pat. No. 5,497,844 which is hereby incorporated by reference. The arm is movable between an engaged and disengaged position, so that when motor 132 is switched on and starts to rotate, an automatic throw-out gear causes the wheels to be engaged through the gear train. When the power switch is not depressed and the motor is off, the wheels are not engaged, allowing pushing of the vehicle without turning the motor driveshaft, thus easing pushing.

While the present invention has been shown and described with reference to the foregoing preferred embodiments, it is to be understood by those skilled in the art that other changes in form and detail may be made therein without departing from the spirit and scope of the invention as defined in the appended claims.

What is claimed is:

1. A children's ride-on vehicle comprising:
    a chassis defining first and second vertical axes and including a seating area configured to accommodate a child;
    a steering control mounted to the chassis and operable by the child to steer the vehicle;
    a motor housing pivotally mounted to the chassis for rotation about the first vertical axis;
    a motor supported in the housing;
    a first axle mounted in the housing to rotate with the housing about the first vertical axis;
    at least one wheel mounted to the first axle for rotation about an axis nominally transverse the vehicle, the at least one wheel operatively coupled to the motor for driving the vehicle;
    a second axle pivotally mounted to the chassis for rotation about a second vertical axis;
    at least one wheel mounted to the second axle for rotation about an axis nominally transverse the vehicle; and
    a steering linkage coupled between the motor housing and the second axle for coordinated pivoting of the motor housing and the second axle,
    wherein the steering control causes the axles to pivot under control of the driver to steer the vehicle.

2. The vehicle of claim 1, wherein the chassis has a generally vertical channel extending therethrough configured to receive and pivotally mount a steering column for rotation about a first vertical axis, and wherein the steering control is coupled to the steering column.

3. The children's ride-on vehicle of claim 1, wherein the steering linkage is eccentrically coupled between the motor housing and the second axle.

4. The children's ride-on vehicle of claim 1, wherein responsive to a determined degree of rotation of the first axle in a selected direction, the steering linkage produces the same degree of rotation of the second axle in an opposite direction.

5. The vehicle of claim 2, further comprising a keyway in the channel and a mating structure on the steering column, the keyway and mating structure configured to limit pivoting of the steering column.

6. The vehicle of claim 5 wherein the keyway and mating structure limit the pivoting of the steering column to about 7° from a nominal position.

7. A children's ride-on vehicle comprising:
    a chassis configured to accommodate a child and including a generally vertical channel extending therethrough;
    a steering control operable by the child to steer the vehicle;
    a front axle mounted to the chassis nominally transverse the vehicle and operable to be offset from nominally transverse, the front axle defining a front transverse axis;
    a steering column pivotally mounted to the channel for rotation about a front vertical axis, the steering column having an upper end coupled to the steering control and a lower end coupled to the front axle so as to offset the axle when the column is rotated about the front vertical axis, the steering column having a nominal position for straight-ahead steering of the vehicle;
    at least one front wheel mounted to the front axle for rotation about the front transverse axis;
    a bracket pivotally mounted to the chassis for rotation about a rear vertical axis;
    a rear axle mounted to the bracket transverse the vehicle, the rear axle defining a rear transverse axis;
    two wheels mounted to the rear axle for rotation about the rear transverse axis; and
    a steering linkage coupled between the front axle and the bracket for coordinated pivoting of the front axle and the rear axles about the respective vertical axes.

8. The vehicle of claim 7 wherein the at least one front wheel includes first and second front wheels mounted to the front axle for rotation about the front transverse axis, the first and second front wheels mounted on opposite ends of the front axle.

9. The vehicle of claim 7 further comprising a motor and gear train housing, the housing coupled to the steering column for rotation with the steering column about the front vertical axis, the housing supporting the axle, a battery, an electric motor powered by the battery, and a gear train operatively driven by the motor and operatively coupled to the at least one front wheel for driving the vehicle.

10. The children's ride-on vehicle of claim 7, wherein the steering linkage is eccentrically coupled between the front axle and the bracket.

11. The children's ride-on vehicle of claim 7, wherein responsive to a determined degree of rotation of the front axle in a selected direction, the steering linkage produces the same degree of rotation of the bracket in an opposite direction.

12. The vehicle of claim 9 wherein the steering column is configured to be inserted into the channel only from above the chassis and the housing is configured to be coupled to the lower end of the steering column only when the steering column has been inserted into the channel.

13. A children's ride-on vehicle comprising:
    a chassis having a seat configured to accommodate a child and having a generally vertical, cylindrical channel extending through the chassis and defining a first vertical axis;

a steering control disposed in front of the seat and operable by the child to steer the vehicle;

a steering column pivotally mounted to the channel in the chassis for rotation about the first vertical axis, the steering column coupled to the steering control, the steering column having a nominal position for straight-ahead steering of the vehicle;

a motor and gear train housing, coupled to the steering column for rotation with the steering column about the first vertical axis, the housing supporting a battery, an electric motor powered by the battery, and a gear train operatively coupled to the motor;

a front axle captured in the housing nominally transverse the vehicle;

two front wheels rotatably held on the front axle and coupled to the gear train for driving the vehicle;

a keyway in the channel and a mating structure on the steering column configured to limit the pivoting of the steering column to about 7° from the nominal position in each direction;

a bracket pivotally mounted adjacent the rear of the chassis for rotation about a second vertical axis;

a rear axle mounted to the bracket transverse the vehicle;

two wheels mounted to the second axle for rotation about an axis transverse the vehicle; and a steering linkage coupled between the front axle and the bracket for coordinated pivoting of the front axle and the rear axle for steering the vehicle.

14. The children's ride-on, vehicle of claim 13, wherein the steering linkage is eccentrically coupled between the front axle and the bracket.

15. The children's ride-on vehicle of claim 13, wherein responsive to a determined degree of rotation of the front axle in a selected direction, the steering linkage produces the same degree of rotation of the bracket in an opposite direction.

* * * * *